United States Patent [19]

Middleton

[11] Patent Number: 5,494,626
[45] Date of Patent: Feb. 27, 1996

[54] METHOD AND APPARATUS FOR THE TREATMENT OF PLASTIC MATERIALS

[75] Inventor: Ashley P. Middleton, Somerset, Great Britain

[73] Assignee: Middleton Engineering Limited, England

[21] Appl. No.: 419,829

[22] Filed: Apr. 11, 1995

[30] Foreign Application Priority Data

Apr. 14, 1994 [GB] United Kingdom ............. 9407393

[51] Int. Cl.⁶ ........................... B29C 43/14
[52] U.S. Cl. ............... 264/115; 264/120; 264/321; 264/DIG. 69; 425/135; 425/289
[58] Field of Search ................. 264/115, 120, 264/321, DIG. 69; 425/135, 289, 383

[56] References Cited

U.S. PATENT DOCUMENTS

| | | | |
|---|---|---|---|
| 5,059,372 | 10/1991 | Klais | 264/120 |
| 5,198,160 | 3/1993 | Chiu | 264/115 |
| 5,204,040 | 4/1993 | Chang | 264/321 |
| 5,286,321 | 2/1994 | Fuss | 264/321 |
| 5,424,026 | 6/1995 | Tohbo et al. | 264/120 |

Primary Examiner—Mary Lynn Theisen
Attorney, Agent, or Firm—Melvin I. Stoltz

[57] ABSTRACT

Expanded or foamed plastic material, such as expanded polystyrene, is fed into a hopper containing an auger which carries blades for cutting the plastic material into pieces and for feeding it into a chamber containing a vertically reciprocable piston and a horizontally reciprocable piston. The two pistons operate sequentially to effect compression of the plastic material and to feed the compressed material into the entry end of a horizontal chute. A hydraulically operated main ram is movable along the chute to effect additional compression of the plastic material and to displace it along the chute for discharge.

10 Claims, 3 Drawing Sheets

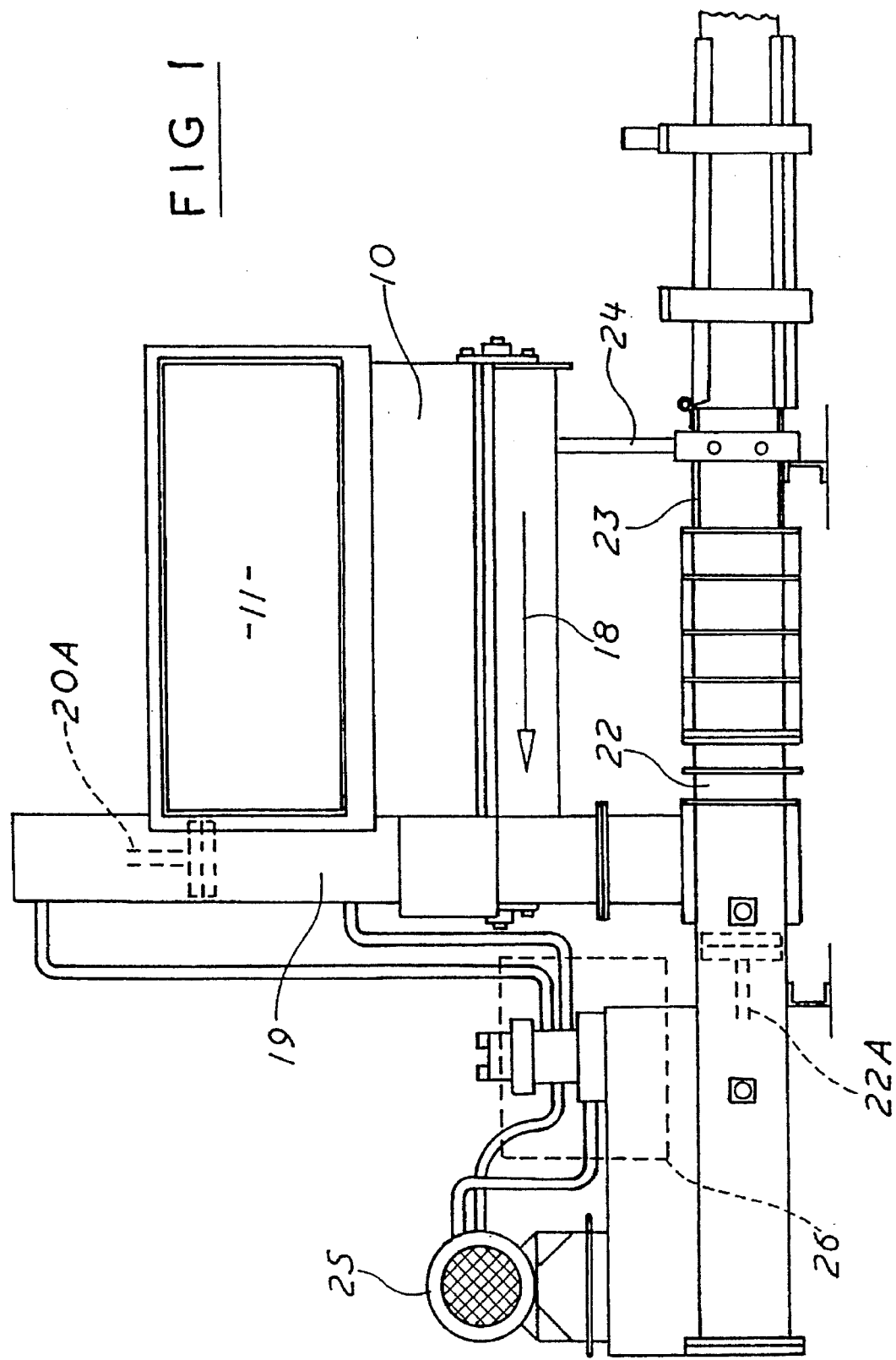

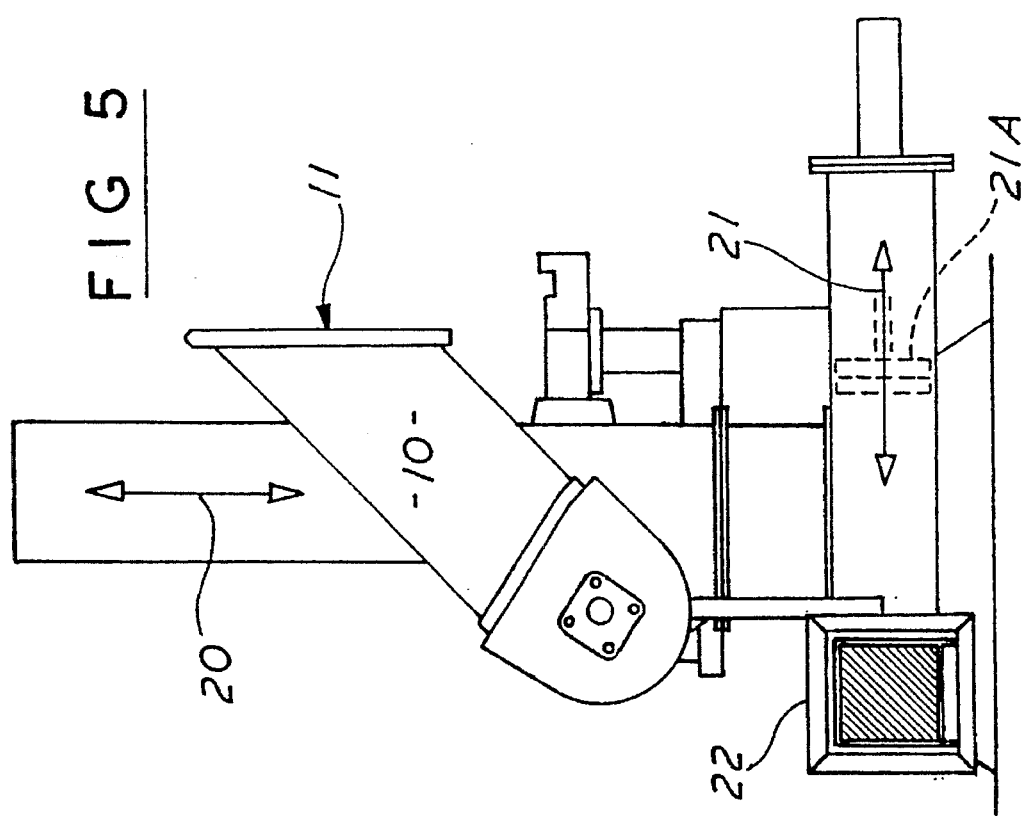
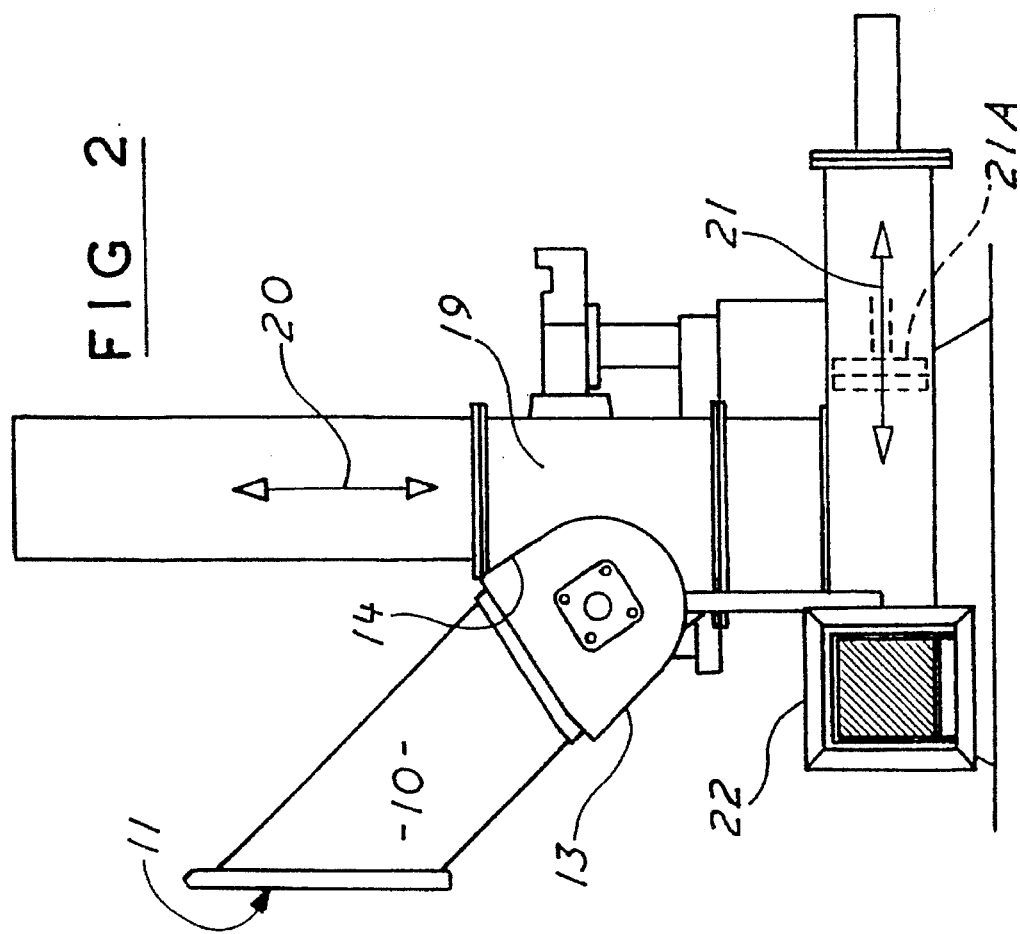

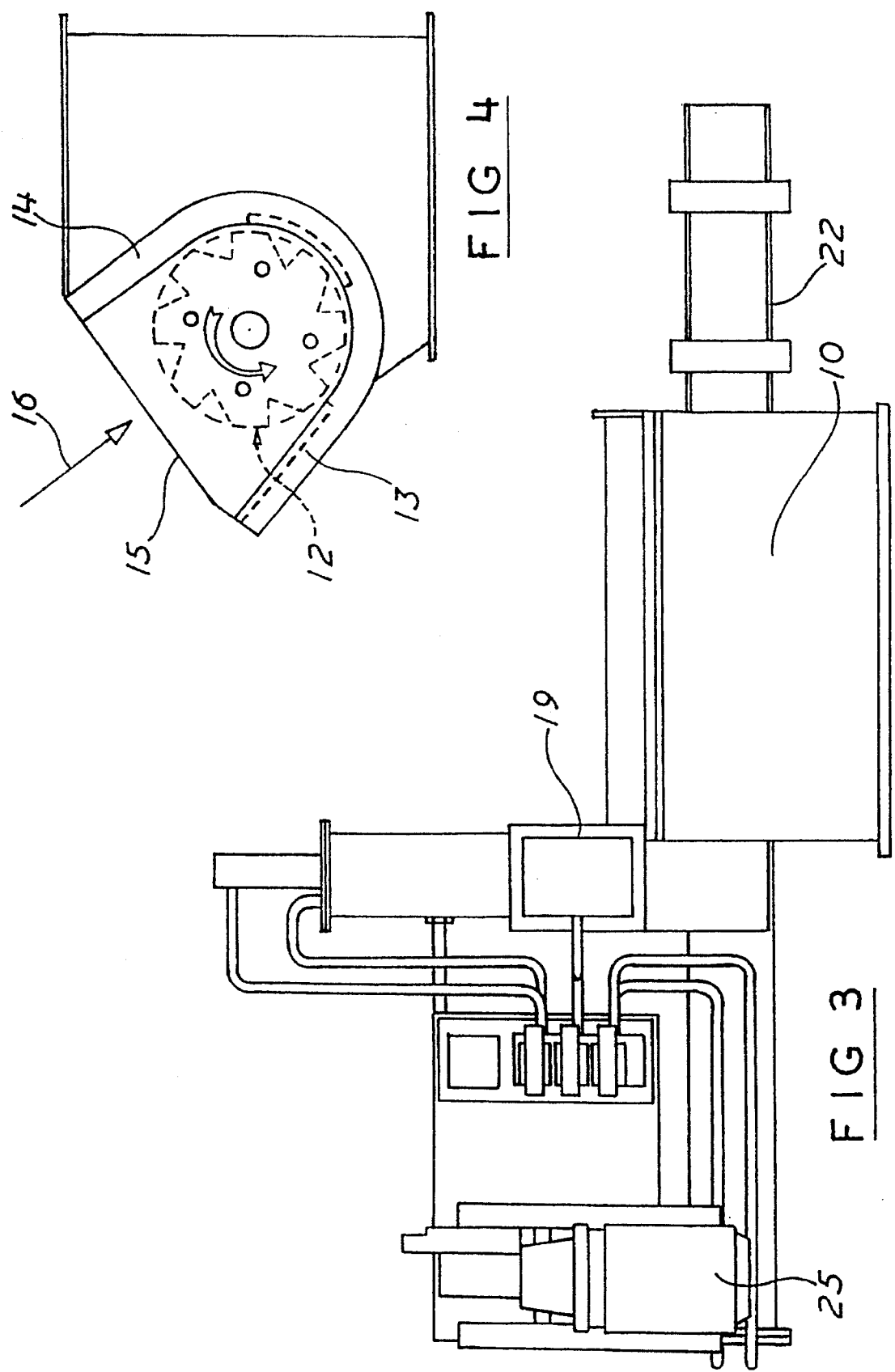

METHOD AND APPARATUS FOR THE TREATMENT OF PLASTIC MATERIALS

FIELD OF THE INVENTION

This invention relates to a method and apparatus for the treatment of expanded and foamed plastic materials, for example, polystyrene, particularly to enable them to be recycled.

Expanded and foamed plastic materials are widely used as packaging materials for, for example, the protection of components being delivered to assembly lines. Companies, therefore, which carry out assembly operations using bought-in components can thus rapidly accumulate large quantities of plastic material which they do not want and which creates disposal problems. It is accordingly an object of the present invention to provide an improved method and improved apparatus for the treatment of such material.

It is a further object of the present invention to provide a method for the treatment of such material which enables it to be recycled.

SUMMARY OF THE INVENTION

According to a first aspect of the present invention there is provided a method for the treatment of expanded or foamed plastic material, said method comprising the following steps:

a) introducing the plastic material into a hopper which contains an auger having a cutting function, b) operating the auger so as to cut the plastic material into pieces and to feed the pieces of plastic material into a chamber containing a first reciprocable piston movable in a first direction to effect compression of the pieces of plastic material and a second reciprocable piston movable in a second direction transverse to said first direction to effect further compression of the pieces of plastic material and to effect transfer of the compressed plastic material into the entry end of a chute containing a reciprocable main ram, c) coordinating control of said first and second reciprocable pistons so that, while the main ram is in its non-advanced position, each of said first and second reciprocable pistons operates through a plurality of cycles to effect the transfer of a quantity of compressed plastic material into the entry end of the chute, and d) operating the main ram so that it advances along the chute to effect additional compression of the plastic material and displaces the plastic material towards the discharge end of the chute before returning to its original position.

Operation of the auger is preferably interrupted during such operation of the main ram.

The first and second reciprocable pistons may be arranged so that each of them goes through a variable number of cycles of operation while the main ram is in its original or non-advanced position.

The chute along which the compressed plastic material is discharged is preferably horizontal and the arrangement is preferably such that operation of the main ram is programmed so that, at the end of a working shift, the main ram will stop in its advanced position. The chute is preferably formed from box-section elements and that part of the chute beyond the advanced position of the main ram is preferably lined with stainless steel and is vented to allow the escape of air from the compressed material as it is advanced along the chute.

The compressed material is preferably discharged from the chute in such manner that it can readily be broken into lengths such that it can be transported using standard pallets.

The main ram is preferably movable hydraulically under the control of a control circuit which also controls the operation of piston and cylinder means acting on one or more flaps forming a wall or walls of the chute so that, when the hydraulic pressure acting on the ram is less than a predetermined value, the flap or flaps is or are pressed inwardly to restrain movement of the compressed plastic material along the chute.

The hopper is preferably mounted above the chute with the arrangement such that the auger serves to cut the plastic material and to feed the pieces of plastic material in the direction opposite to that in which the compressed plastic material is fed along the chute. A generally compact design is thus obtained.

The cross-sectional areas of the pistons and their travel will preferably be so chosen that, during the feeding of the cut pieces of material from the hopper into the entry end of the chute, the plastic material is compressed to a density approximately equal to half its final compressed density. For example, if the method of operation is such that the density of the final compressed material is of the order of forty or fifty times that of the original expanded or foamed material, the density of the material fed into the entry end of the chute will be of the order of twenty to twenty five times that of the original material.

During compression of the plastics material, substantial heat will be generated. If, therefore, the expanded or foamed material fed into the hopper is wet or damp, steam may be produced as a result of such heat generation. Provision may accordingly be made for the escape of such steam. The head of the main ram may accordingly be provided with vent or other means to facilitate the escape of steam.

According to a second aspect of the present invention there is provided apparatus for the treatment of expanded or foamed plastic material, said apparatus comprising:

a) a hopper into which the plastic material can be fed, b) an auger having a cutting function located within the hopper, c) control means for controlling operation of the auger, d) a chamber into which pieces of the plastic material are fed upon operation of the auger, e) a first reciprocable piston movable within said chamber in a first direction to effect compression of the pieces of plastic material, f) a second reciprocable piston movable within said chamber in a second direction transverse to said first direction to effect further compression of the pieces of plastic material, g) a chute containing a reciprocable main ram movable between a non-advanced and an advanced position, h) said chute having an entry end arranged so that it is in communication with said chamber so that operation of the second reciprocable piston serves to transfer the compressed pieces of plastic material into the entry end of the chute, i) control means for controlling operation of the first and second reciprocable pistons and the main ram so that, while the main ram is in its non-advanced or original position, each of said first and second pistons operates through a plurality of cycles to effect the transfer of a quantity of compressed plastic material into the entry end of the chute, j) said control means controlling operation of the main ram so that it advances along the chute to effect additional compression of the plastic material and to displace the plastic material towards the discharge end of the chute before returning to its original position, and k) the compressed plastic material being conveyed progressively along the chute during successive cycles of operation of the main ram so that the plastic material is formed into a bale from which lengths are or can be broken off.

The control means for controlling operation of the auger is preferably coordinated with the control means for controlling operation of the first and second reciprocable pistons and the main ram such that operation of the auger is interrupted during advancing movement of the main ram.

The control means for controlling operation of the auger and the control means for controlling operation of the pistons and ram are preferably combined to afford a common control system.

The auger is preferably arranged for rotation about a substantially horizontal axis and the hopper within which the auger is disposed is preferably formed primarily of wood. Wood is the preferred material because of its sound-damping characteristics. The noise level generated with a wooden hopper is found to be many decibels less than the sound generated with a hopper of similar design produced from, for example, mild steel.

The hopper preferably has a pair of walls which define the sides of the hopper, said walls being inclined to the horizontal with the space between the ends of the walls defining an open mouth into which the plastic material can be fed. The walls are preferably non-symmetrical such that there is, in effect, an entry portion on one side of the axis of the auger which is wider than the space between the auger axis and the opposite wall of the hopper.

A conveyor may be provided for feeding the material into the hopper.

BRIEF DESCRIPTION OF THE DRAWINGS

FIG. 1 is a front view of an apparatus for use in the treatment of expanded and foamed plastic materials, FIG. 2 is an end view of the apparatus shown in FIG. 1, FIG. 3 is a plan view of the apparatus shown in FIG. 1, FIG. 4 is a detail view showing the cross-section of the hopper of said apparatus, and FIG. 5 is an end view similar to FIG. 2, but showing an alternative form of apparatus.

DESCRIPTION OF THE PREFERRED EMBODIMENTS

The apparatus shown in FIGS. 1 to 4 of the drawings includes a hopper 10 into which articles formed from expanded or foamed plastic material, particularly expanded polystyrene, are fed. The hopper 10 has a mouth 11 into which the plastic articles are inserted and this mouth 11 contains vertical flexible plastic strips (not shown) which serve to prevent unwanted ejection of the articles. The hopper 10 contains an auger 12 which is arranged to rotate about a horizontal axis. The auger 12 carries a number of cutting elements or blades arranged so that, as the auger 12 rotates the blades subject the expanded or foamed plastic articles to a cutting action and effectively cut the articles into pieces having a maximum size similar to that of a tennis ball.

The hopper 10 has wooden side walls 13 and 14 which, as can be seen from FIGS. 2 and 4, are inclined to the vertical and the height of the lower edge of the mouth 11 is such that an operator can readily insert the plastic articles into said mouth 11 so as to fall towards the base of the hopper 10. The base of the hopper 10 is of curvate form, as shown in FIG. 4, and, as can be seen from FIG. 4, the walls 13 and 14 are not parallel to one another but diverge slightly, i.e. by about 15°, in the direction away from the curvate base of the hopper 10. If, therefore, one considers the plastic material as moving towards the base of the hopper 10 across the plane 15 indicated in FIG. 4 in the direction indicated by the arrow 16 in this figure, the axis about which the auger 12 is rotating (in an anti-clockwise direction as viewed in FIG. 4) will not be located centrally of this plane 15 and the plastic articles will tend to fall to the left of the axis of the auger 12 as viewed in FIG. 4, such tendency being assisted by gravity, thus enhancing the cutting action effected by the auger blades.

The cut pieces of plastic material are advanced by the auger 12 in the direction indicated by the arrow 18 in FIG. 1 so as to be discharged from the hopper 10 into a vertical chamber 19 which contains a first reciprocable piston (indicated diagrammatically at 20A in FIG. 1) movable hydraulically in the direction indicated by the arrow 20 in FIG. 2. The first reciprocable piston 20A moves downwardly so that it compresses the pieces of plastic material at the base of the chamber 19. The volume of the chamber 19 above the first reciprocable piston 20A is connected by a suction line (not shown) to a large bag to which a suction pump (not shown) is connected so that particles of the plastic material which find their way past the piston 20A will be drawn out of the upper part of the chamber 19 into the bag. The suction pump operates continuously to ensure that there is no build-up of plastic material above the piston 20A. Generally conventional piston and cylinder mechanisms can thus be employed without any demand for critical tolerances. The piston 20A is fitted with a plastic liner to reduce the coefficient of sliding friction and to ensure a close fit of the piston 20A within its cylinder.

A second reciprocable piston (indicated diagrammatically at 21A in FIG. 2) is arranged for horizontal movement in the direction indicated by the arrow 21 in FIG. 2 and serves to effect additional compression of the compressed plastic material at the bottom of chamber 19 and to transfer the compressed plastic material into the entry end of a horizontal chute 22 which contains a main ram (indicated diagrammatically at 22A in FIG. 1) movable horizontally to effect additional compression of the compressed plastic material and to displace it from the entry end to the exit end of the chute 22. In the same way that the remote side of the first reciprocable piston 20A is exhausted, the remote sides of the second reciprocable piston 21A and of the main ram 22A are connected by suction lines (not shown) to the large bag in which particles of plastic material are collected. This large bag is conveniently located alongside the chute 22 adjacent the discharge end of the chute 22.

The hydraulic fluid supplied to the piston and cylinder mechanisms and to the ram is obtained from a common supply driven by a motor 25 and a control system is provided for ensuring that the various parts of the apparatus operate in the required sequence. The control system is contained within a box indicated in outline at 26 in FIG. 1 and may include a Telemecanique TSX17 PLC which is programmed to provide the required control functions and is connected to a series of sensors. There is, for example, a photoelectric cell (not shown) which acts as a sensor to sense the presence of plastic material in the hopper 10 so that the auger 12 will not be driven when there is no plastic material in the hopper 10.

When the apparatus is switched off at the end of a cycle of operations, the main ram 22A will initially be in its advanced position, i.e. there will be no plastic material in contact with that part of the wall of the chute 22 which is contacted by the main ram 22A as it moves backwards and forwards. The first reciprocable piston 20A will be in its raised position and the second reciprocable piston 21A will be in its left-hand limiting position as viewed in FIG. 2.

When, therefore, the apparatus is started, the main ram 22A will move first to its retracted position and then the auger 12 will be started. As the auger 12 starts to feed pieces of cut plastic material into the chamber 19, the cycle of operations of the first and second reciprocable pistons 20A and 21A will be started. The second reciprocable piston 21A will be retracted, i.e. moved to the right as viewed in FIG. 2, and the first reciprocable piston 20A will be moved downwardly to compress a first charge of cut pieces of the plastic material at the bottom of the chamber 19.

The first reciprocable piston 20A will then be moved upwardly towards its original, upper position and, as the first piston 20A is being moved upwardly, the second reciprocable piston 21A will start moving to the left to displace the compressed pieces of plastic material into the entry end of the chute 22 and to effect further compression of the plastic material. The auger 12 will continue to operate during the down and up movements of the first piston 20A and the out and in movements of the second piston 21A and the procedure will continue until each piston 20A, 21A has gone through three cycles. The pistons 20A and 21A will then be halted and the auger 12 will be stopped while the main ram 22A makes an advancing movement and then returns to its retracted position.

Movement of the compressed plastic material is effected against the action of a flap or a pair of flaps 23 which is or are hingedly mounted and is or are biassed inwardly against the side of the formed bale of plastic material under the action of a piston and cylinder mechanism 24. The apparatus control system is responsive to the operating pressure acting on the main ram 22A so that, when a predetermined pressure is reached, the piston and cylinder mechanism 24 acting on the flap or flaps 23 is relieved to allow outward hinging movement of the flap or flaps 23. The predetermined pressure at which the flap or flaps 23 is or are allowed to yield may be, for example, 130 bar and the maximum pressure applied to the main ram 22A may be in the range of from 140 to 160 bar.

The portion of the chute 22 to the left of the flap or flaps 23, as viewed in FIG. 1, is vented so that, as the compressed plastic material is advanced along the chute 22, any air or other gases entrapped in the compressed plastic material can escape through the vents. That part of the wall of the chute 22 beyond the limit of travel of the main ram 22A is lined with stainless steel to avoid or reduce the likelihood of corrosion of the chute 22 which, for ease of manufacture is produced from box-section components. The total length of the chute 22 will be such that, by the time that the baled material is discharged from the end of the chute 22, it will have cooled to such an extent that it will not tend to expand when it is no longer constrained by the walls of the chute 22.

The degree of compression of the expanded or foamed plastic material will depend, among other factors, on the hydraulic pressures which act on the pistons 20A and 21A and on the main ram 22A and on the travels of the two pistons 20A and 21A and of the ram 22A. For, for example, expanded polystyrene, the apparatus parameters can be set so that, by the time that the plastic material has been charged into the entry end of the chute 22, its density has been increased so that it is of the order of twenty to twenty five times its original density whereas, when the baled material is discharged from the exit end of the chute 22, its density can be of the order of forty five times its original density. The first reciprocable piston 20A may operate under a maximum pressure of 7.5 tons to compress the plastic material so that its density is increased approximately four times.

The second reciprocable piston 21A may operate under a maximum pressure of 18.9 tons to effect further compression of the plastic material so that its density is increased to between twenty and twenty five times its original value and the main ram 22A may operate under a maximum pressure of 48.5 tons to effect the final increase in the density of the plastic material.

The number of cycles of operation of the first and second reciprocable pistons 20A and 21A may be varied, if required, to effect the required degree of compression of the plastics material before it is transferred into the entry end of the chute 22. In the arrangement described above, the pistons 20A and 21A go through three cycles of operation between successive operations of the main ram 22A.

No external heat is applied to the plastic material as it is being compressed. The temperature of the plastic material will, however, be raised as the material is being compressed but the extent by which the temperature is raised will not result in degradation of the physical characteristics of the plastic material. The baled material will thus have characteristics similar to the original raw material so that, if the raw material is polystyrene, the baled material will be reusable either on its own, or in combination with approximately equal quantities of the original raw material.

Turning next to FIG. 5, this shows an alternative arrangement in which the hopper 10 is inclined to the vertical in the opposite direction to that of the embodiment shown in FIGS. 1 to 4. This enables the overall width of the apparatus to be reduced—the width being the measurement from right to left in FIGS. 2 and 5. This reduction in width facilitates transport and containerisation of the apparatus.

The apparatus shown in the drawings and described above is intended to be used for the treatment of dry plastic material. If, however, the plastic material is wet, the temperature increase which is produced may be such as to cause the generation of steam. Such generation of steam could cause the discharge of the compressed material along the chute to be impeded and if, therefore, the material to be compressed contains moisture, the head of the main ram 22A will be formed with vent or other means to allow for the escape of steam as the plastic material is compressed at the entry end of the chute 22 upon engagement by the head of the main ram 22A.

It will thus be seen that use of the apparatus converts a high bulk material which is expensive to transport and which has little resale value into a more dense material which is not only less expensive to transport but has a resale value. The invention is thus "environmentally friendly".

The apparatus may thus be used in conjunction with a granulator which converts the baled material into granules of polystyrene for reuse.

The apparatus may also be used in conjunction with a conveyor for feeding the plastic material into the hopper 10.

I claim:

1. A method for the treatment of expanded or foamed plastic material, said method comprising the following steps:

a) introducing the plastic material into a hopper which contains an auger having a cutting function, b) operating the auger so as to cut the plastic material into pieces and to feed the pieces of plastic material into a chamber containing a first reciprocable piston movable in a first direction to effect compression of the pieces of plastic material and a second reciprocable piston movable in a second direction transverse to said first direction to effect further compression of the pieces of plastic material and to effect transfer of the compressed plastic material into the entry end of a chute containing a reciprocable main ram, c) coordinating control of said first and second reciprocable pistons so that, while the main ram is in its non-advanced position, each of said first and second reciprocable pistons operates through a plurality of cycles to effect the transfer of a quantity of compressed plastic material into the entry end of the chute, and d) operating the main ram so that it advances along the chute to effect additional compression of the plastic material and displaces the plastic material towards the discharge end of the chute before returning to its original position.

2. A method as claimed in claim 1, in which operation of the auger is interrupted during advancing movement of the main ram.

3. A method as claimed in claim 1, in which the chute along which the compressed plastic material is discharged is horizontal and in which operation of the main ram is programmed so that, at the end of a working shift, the main ram will stop in its advanced position.

4. Apparatus for the treatment of expanded or foamed plastic material, said apparatus comprising:

a) a hopper into which the plastic material can be fed, b) an auger having a cutting function located within the hopper, c) control means for controlling operation of the auger, d) a chamber into which pieces of the plastic material are fed upon operation of the auger, e) a first reciprocable piston movable within said chamber in a first direction to effect compression of the pieces of plastic material, f) a second reciprocable piston movable within said chamber in a second direction transverse to said first direction to effect further compression of the pieces of plastic material, g) a chute containing a reciprocable main ram movable between a non-advanced and an advanced position, h) said chute having an entry end arranged so that it is in communication with said chamber so that operation of the second reciprocable piston serves to transfer the compressed pieces of plastic material into the entry end of the chute, i) control means for controlling operation of the first and second reciprocable pistons and the main ram so that, while the main ram is in its non-advanced or original position, each of said first and second pistons operates through a plurality of cycles to effect the transfer of a quantity of compressed plastic material into the entry end of the chute, j) said control means controlling operation of the main ram so that it advances along the chute to effect additional compression of the plastic material and to displace the plastic material towards the discharge end of the chute before returning to its original position, and k) the compressed plastic material being conveyed progressively along the chute during successive cycles of operation of the main ram so that the plastic material is formed into a bale from which lengths are or can be broken off.

5. Apparatus as claimed in claim 4, in which the control means for controlling operation of the auger is coordinated with the control means for controlling operation of the first and second reciprocable pistons and the main ram such that operation of the auger is interrupted during advancing movement of the main ram.

6. Apparatus as claimed in claim 5, in which the control means for controlling operation of the auger and the control means for controlling operation of the pistons and ram are combined to afford a common control system.

7. Apparatus as claimed in claim 5, in which the chute is formed from box-section elements and that part of the chute beyond the advanced position of the main ram is lined with stainless steel and is vented to allow the escape of air or other gases from the compressed material as it is advanced along the chute.

8. Apparatus as claimed in claim 5, in which the main ram is movable hydraulically and in which one or more flaps are provided forming a wall or walls of the chute, and piston and cylinder means associated with said one or more flaps with the arrangement such that, when the hydraulic pressure acting on the ram is less than a predetermined value, the flap or flaps is or are pressed inwardly to restrain movement of the compressed plastic material along the chute.

9. Apparatus as claimed in claim 5, in which the auger is arranged for rotation about a substantially horizontal axis and the hopper within which the auger is disposed is formed primarily of wood.

10. Apparatus as claimed in claim 9, in which the hopper has a pair of walls which define the sides of the hopper, said walls being inclined to the horizontal with the space between the ends of the walls defining an open mouth into which the plastic material can be fed, said walls being non-symmetrical such that there is, in effect, an entry portion on one side of the axis of the auger which is wider than the space between the auger axis and the opposite wall of the hopper.

* * * * *